United States Patent
Inoshita et al.

(10) Patent No.: US 12,234,893 B2
(45) Date of Patent: Feb. 25, 2025

(54) EXTENSION-RETRACTION DEVICE

(71) Applicant: TOYOTA JIDOSHA KABUSHIKI KAISHA, Toyota (JP)

(72) Inventors: Hirofumi Inoshita, Toyota (JP); Satoshi Kojima, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/480,772

(22) Filed: Oct. 4, 2023

(65) Prior Publication Data

US 2024/0209923 A1 Jun. 27, 2024

(30) Foreign Application Priority Data

Dec. 21, 2022 (JP) ................. 2022-204015

(51) Int. Cl.
*F16H 19/06* (2006.01)
(52) U.S. Cl.
CPC .............. *F16H 19/0618* (2013.01)
(58) Field of Classification Search
CPC .. F16H 2019/0677; F16G 11/12; B65H 20/20
USPC ....................................................... 74/89.2
See application file for complete search history.

(56) References Cited

U.S. PATENT DOCUMENTS

| | | | | |
|---|---|---|---|---|
| 3,367,549 A | * | 2/1968 | Assony | B41L 5/06 226/74 |
| 3,688,959 A | * | 9/1972 | Staneck | B65H 20/20 226/75 |
| 4,316,567 A | * | 2/1982 | Grear | B65H 20/20 226/74 |
| 11,945,546 B2 | * | 4/2024 | Mejia Cobo | B62M 9/16 |

FOREIGN PATENT DOCUMENTS

JP 2007192257 A * 8/2007

* cited by examiner

*Primary Examiner* — Gregory Robert Weber
(74) *Attorney, Agent, or Firm* — SoraIP, Inc.

(57) ABSTRACT

The extension-retraction device according to the present disclosure is an extension-retraction device in which a first belt and a second belt wound around the outside of the first belt are spirally wound around a tubular structure. The second belt includes an engaging pin having a fitting portion that fits into a hole of the first belt and an insertion portion that protrudes from the fitting portion and is inserted into the hole of the first belt. The fitting portion has a cylindrical shape having a diameter corresponding to the hole of the first belt, and the side surface of the insertion portion is inclined so that the diameter of the insertion portion decreases toward the tip portion.

1 Claim, 5 Drawing Sheets

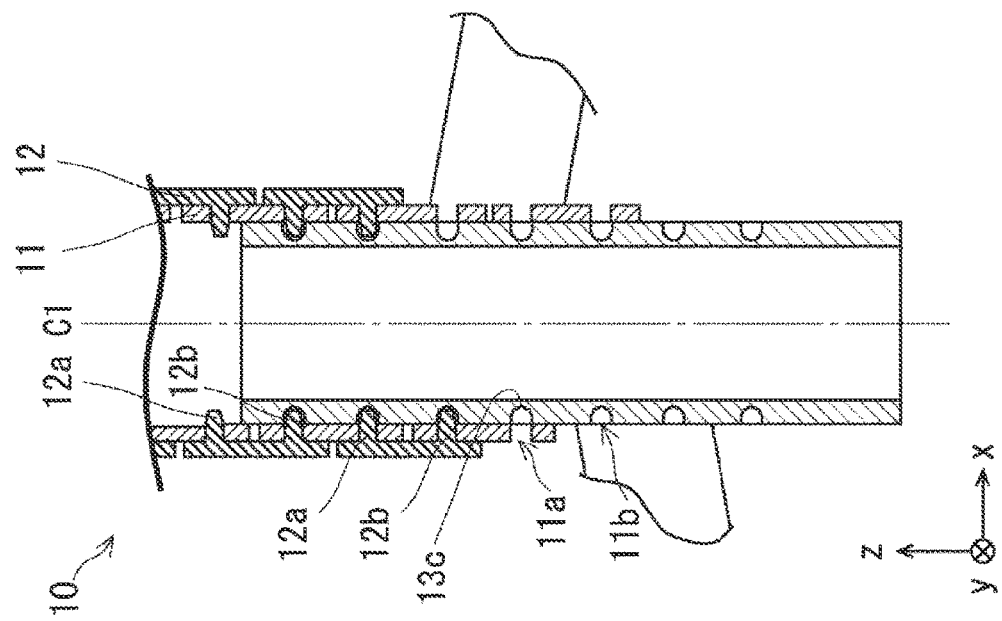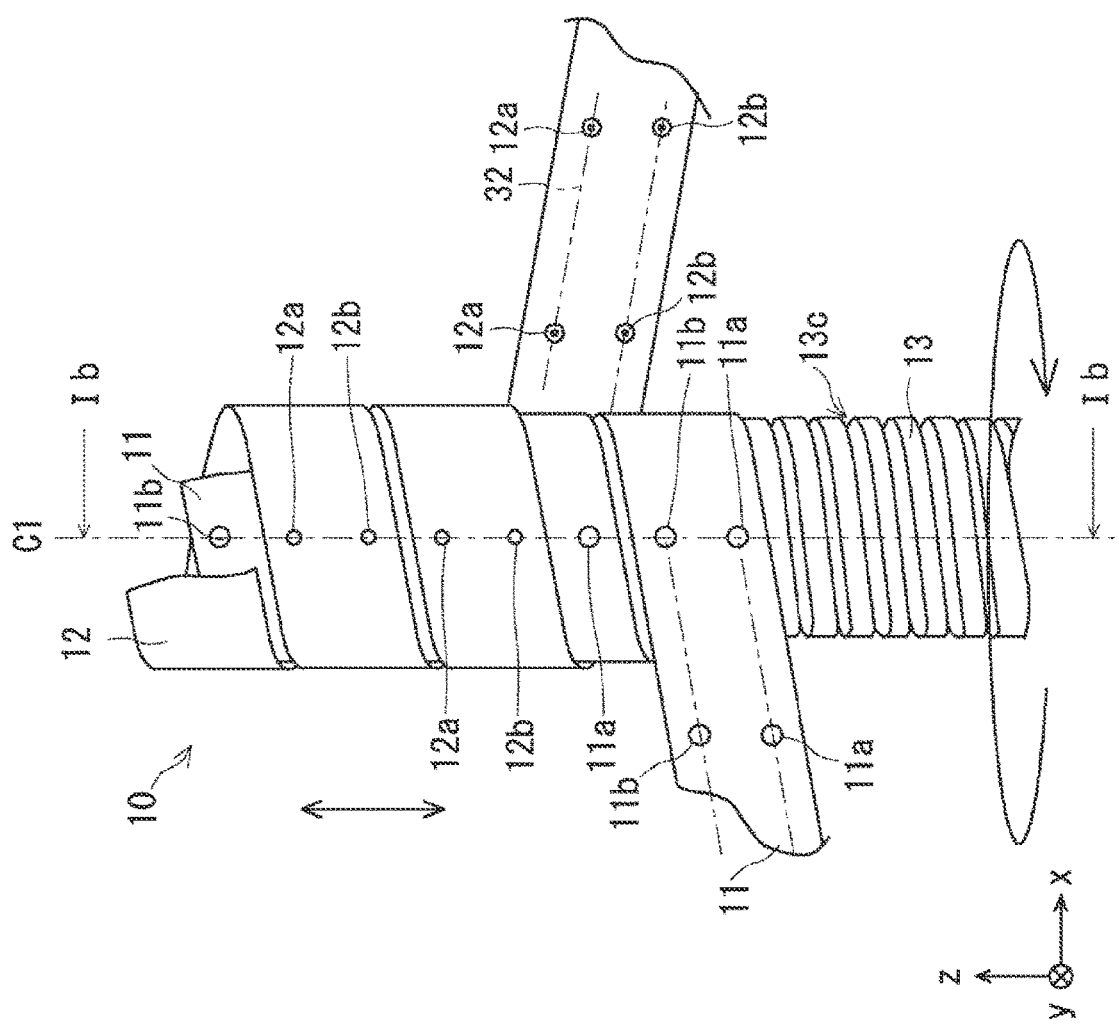

FIG. 2
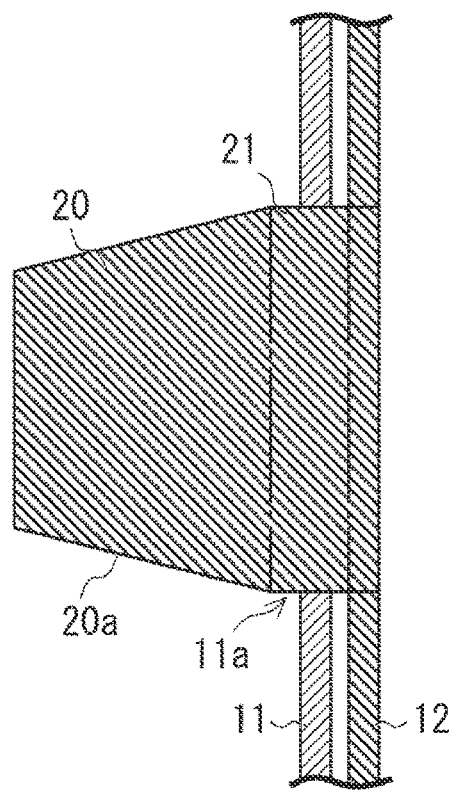
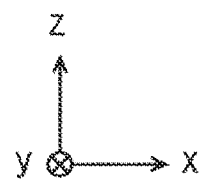

EXTENSION-RETRACTION DEVICE

CROSS-REFERENCE TO RELATED APPLICATION

This application claims priority to Japanese Patent Application No. 2022-204015 filed on Dec. 21, 2022, incorporated herein by reference in its entirety.

BACKGROUND

1. Technical Field

The present disclosure relates to an extension-retraction device.

2. Description of Related Art

Japanese Unexamined Patent Application Publication No. 2007-192257 (JP 2007-192257 A) discloses an extension-retraction device that can be compactly stored by spirally winding two belts around a tubular structure with the two belts being half-width offset from each other and overlapping each other. An engaging pin to be inserted into a hole of an inner belt is attached to an outer belt, and the two belts are integrated via the engaging pin. By rotating the two belts by the power of the motor, the extension-retraction device is extendable and retractable.

SUMMARY

In the above-described extension-retraction device, since the engaging pin is tapered so as to be able to be easily inserted into the hole of the inner belt, a gap is formed when the engaging pin is inserted into the hole of the inner belt. Therefore, there is a possibility that the engaging pin is disengaged from the hole of the inner belt due to the load during extension and retraction, and the two belts may be disengaged.

The present disclosure has been made in view of such circumstances, and provides an extension-retraction device capable of suppressing two belts from disengaging from each other during extension and retraction.

An extension-retraction device according to the present disclosure is an extension-retraction device in which a first belt and a second belt wound on an outside of the first belt are wound around a tubular structure in a spiral. The second belt includes an engaging pin provided with a fitting portion that fits into a hole of the first belt, and with an insertion portion protruding from the fitting portion and inserted into the hole of the first belt. The fitting portion has a cylindrical shape with a diameter corresponding to the hole of the first belt. A side surface of the insertion portion is inclined such that a diameter of the insertion portion decreases toward a distal end portion of the insertion portion.

In the extension-retraction device according to the present disclosure, the fitting portion of the engaging pin has a diameter corresponding to the hole of the first belt. Therefore, the fitting portion of the engaging pin is fitted into the hole of the first belt without a gap. Accordingly, it is possible to suppress the first belt and the second belt from being disengaged from each other during extension and retraction of the extension-retraction device.

An inclination of the side surface of the insertion portion may have an involute curve shape, a base circle of the involute curve shape being a circle with the same center as a center of the tubular structure and with a diameter equal to or smaller than a diameter of the tubular structure.

With such a configuration, the engaging pin is easily inserted into the hole of the first belt.

The diameter of the base circle may be equal to the diameter of the tubular structure. Also with such a configuration, the engaging pin is easily inserted into the hole of the first belt.

According to the present disclosure, it is possible to provide an extension-retraction device capable of suppressing the two belts from disengaging from each other during extension and retraction.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 1A is a side view of an extension-retraction portion in an extension-retraction device according to a first embodiment;

FIG. 1B is a cross-sectional view of an extension-retraction portion in the extension-retraction device according to a first embodiment;

FIG. 2 is a cross-sectional view illustrating a shape of an engaging pin in the extension-retraction device according to the first embodiment;

DETAILED DESCRIPTION OF EMBODIMENTS

Figure 3:
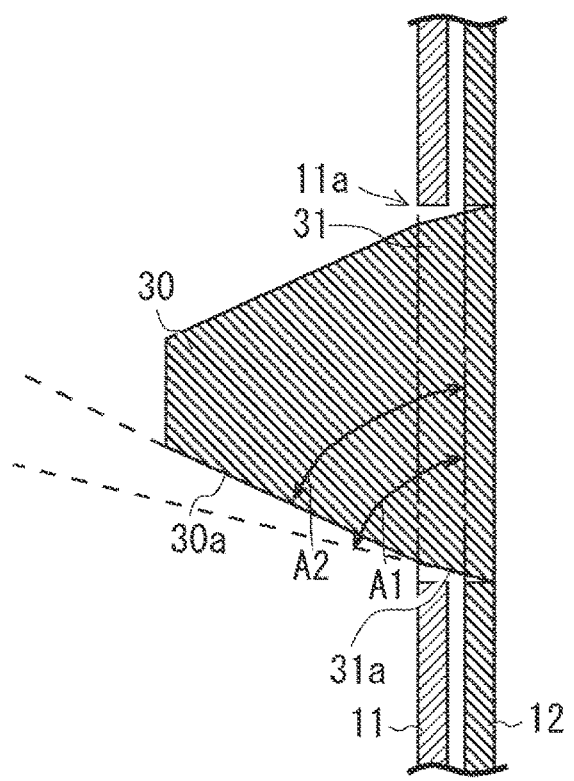
FIG. 3 is a cross-sectional view showing a shape of an engaging pin in the extension-retraction device according to the comparative example.

Hereinafter, the present disclosure will be described through embodiments of the present disclosure, but the present disclosure according to the scope of the claims is not limited to the following embodiments. Moreover, not all of the configurations described in the embodiments are indispensable as means for solving the problem. For the sake of clarity, omission and simplification are made as appropriate in the following description and drawings. In the drawings, the same elements are designated by the same reference signs, and duplicate descriptions are omitted as necessary. It should be understood that the right-hand system xyz Cartesian coordinates illustrated in the drawings are for convenience of describing the positional relation of the constituent elements. Generally, the z-axis positive direction is vertically upward, and the xy plane is a horizontal plane.

First Embodiment

Configuration of the Extension-Retraction Device

First, the configuration of the extension-retraction device according to the first embodiment will be described referring to FIG. 1A and FIG. 1B. FIG. 1A is a side view of an extension-retraction portion in an extension-retraction device according to a first embodiment. FIG. 1B is a cross-sectional view of an extension-retraction portion in the extension-retraction device according to a first embodiment, and corresponds to a cross-section taken along an Ib-Ib of a cross-sectional line of FIG. 1A.

As shown in FIG. 1A, the extension-retraction portion 10 is configured such that the first belt 11, the second belt 12 wound on the outer side of the first belt 11, and the tubular structure 13 are wound in a spiral shape around the central axial C1 of the tubular structure 13.

As shown in FIG. 1A, in the extension-retraction portion 10, the second belt 12 is wound from the outer side while being shifted by a half width with respect to the first belt 11. More specifically, the upper edge portion of the second belt 12 overlaps the lower edge portion of the first belt 11 disposed above it from the outside, and the lower edge portion of the second belt 12 overlaps the upper edge portion of the first belt 11 disposed below it from the outside.

As shown in FIG. 1A, the second belt 12 comprises an engaging pin 12a, 12b. The engaging pin 12a, 12b are provided at two positions on the upper edge side and the lower edge side at a predetermined distance from each other in the longitudinal direction of the second belt 12.

As shown in FIG. 1A, the first belt 11 comprises a hole 11a, 11b. The hole 11a, 11b are provided at two positions on the upper edge side and the lower edge side at a predetermined distance from each other in the longitudinal direction of the first belt 11.

The engaging pin 12a fits into the hole 11a and the engaging pin 12b fits into the hole 11b. That is, in the extension-retraction portion 10, the engaging pin 12a, 12b is fitted into the corresponding hole 11a, 11b while the second belt 12 is wound from the outside by being shifted by a half width with respect to the first belt 11.

As shown in FIG. 1A, FIG. 1B, the tubular structure 13 is formed with a spiral-shaped groove 13c. As shown in FIG. 1B, in the extension-retraction portion 10, the engaging pin 12a, 12b of the second belt 12 is fitted into the hole 11a, 11b of the corresponding first belt 11, and is slidably carried into the groove 13c of the tubular structure 13. In this way, the first belt 11, the second belt 12, and the tubular structure 13 form an integral structure.

Configuration of the Telescopic Device

Next, the operation of the extension-retraction portion 10 in the extension-retraction device according to the first embodiment will be described referring to FIG. 1A and FIG. 1B.

First, the extension-retraction portion 10 is extended in the central axis C1 direction (z-axis positive direction) of the tubular structure 13. As shown in FIG. 1A, a rotational force by a motor (not shown) is applied to the tubular structure 13. Here, although not shown in FIG. 1A of the drawings, a housing portion for accommodating the first belt 11 and the second belt 12 while winding is provided radially outward of the tubular structure 13.

When the tubular structure 13 is rotated in the direction indicated by the arrow around the central axis C1, the first belt 11 and the second belt 12 wound around the accommodating portion are engaged with each other while being wound up along the groove 13c, and are spirally wound around the tubular structure 13. As described above, the first belt 11 and the second belt 12 fed out from the accommodation portion are spirally wound around the tubular structure 13 while being engaged with each other, whereby the extension-retraction portion 10 can be extended in the direction of the central axis C1.

On the other hand, the extension-retraction portion 10 is contracted in the central axis C1 direction (z-axis negative direction) of the tubular structure 13. In this case, it is rotated in the direction opposite to the direction indicated by the arrow in FIG. 1A. When the tubular structure 13 is rotated in the direction opposite to the direction indicated by the arrow around the central axis C1, the first belt 11 and the second belt 12 spirally wound around the tubular structure 13 are disengaged from each other while moving along the groove 13c, and are rewound to the accommodating portion. As described above, the first belt 11 and the second belt 12 spirally wound around the tubular structure 13 are rewound to the accommodation portion, whereby the extension-retraction portion 10 can be contracted in the direction of the central axis C1. Further, the first belt 11 and the second belt 12 can be compactly stored by rewinding the first belt 11 and the second belt 12 to the storage portion.

Engaging Pin Shape

Next, the shape of the engaging pin in the extension-retraction device according to the first embodiment will be described with reference to FIG. 2. The shape of the engaging pin 12a will be described because the engaging pin 12a and the engaging pin 12b shown in FIG. 1A and FIG. 1B have the same shape. FIG. 2 is a cross-sectional view illustrating a shape of an engaging pin in the extension-retraction device according to the first embodiment.

As shown in FIG. 2, the engaging pin 12a includes an insertion portion 20 and a fitting portion 21. The insertion portion 20 protrudes from the fitting portion 21 and is inserted into the hole 11a of the first belt 11. The fitting portion 21 is fitted to the hole 11a of the first belt 11.

The shape of the insertion portion 20 will be described in detail with reference to FIG. 2. The insertion portion 20 has a truncated cone shape in which the side surface of the insertion portion 20 is inclined so that the diameter in the z-axis direction becomes smaller toward the tip portion. As described above, the diameter of the insertion portion 20 in the z-axis direction decreases toward the tip portion. Therefore, when the second belt 12 is wound from the outer side of the first belt, the engaging pin 12a can be inserted into the hole 11a.

The shape of the fitting portion 21 will be described in detail with reference to FIG. 2. The fitting portion 21 has a cylindrical shape having a diameter corresponding to the hole 11a of the first belt 11. In FIG. 2, the thickness of the fitting portion 21 (in the x-axis direction) is larger than the thickness of the first belt 11. However, the thickness of the fitting portion 21 (in the x-axis direction) may be equal to the thickness of the first belt 11.

Engaging Pin Shape According to the Comparative Example

Next, the shape of the engaging pin in the extension-retraction device according to the comparative example will be described with reference to FIG. 3. The extension-retraction device according to the comparative example differs from the extension-retraction device according to the first embodiment in the shape of the engaging pin. Since the other configuration is the same, the description will be omitted. FIG. 3 is a cross-sectional view illustrating a shape of an engaging pin in an extension-retraction device according to a comparative example.

As shown in FIG. 3, the engaging pin 32a of the extension-retraction device according to the comparative embodiment includes an insertion portion 30 and a fitting portion 31. The insertion portion 30 is formed to protrude from the fitting portion 31.

As shown in FIG. 3, the insertion portion 30 has a truncated conical shape in which the side surface 30a of the insertion portion 30 is inclined so that the diameter in the z-axis direction decreases toward the distal end portion.

As shown in FIG. 3, the fitting portion 31 has a truncated conical shape in which the side surface 31a of the fitting portion 31 is inclined so that the diameter in the z-axis direction becomes smaller toward the distal end portion.

Here, the angle A1 formed by the side surface 31a and the straight line parallel to the z-axis is larger than the angle A2 formed by the side surface 30a and the straight line parallel to the z-axis. In other words, the engaging pin 32a is tapered in two steps so as to gradually decrease toward the distal end portion with the insertion portion 30 and the fitting portion 31 as a boundary.

Therefore, as shown in FIG. 3, when the fitting portion 31 of the engaging pin 32a is fitted to the hole 11a of the first belt 11, a gap is formed between the fitting portion and the hole 11a of the first belt 11. Therefore, the first belt 11 and the second belt 12 are easily disengaged from each other when the extension-retraction device expands and contracts.

On the other hand, the fitting portion 21 of the engaging pin 12a shown in FIG. 2 has a cylindrical shape having a diameter corresponding to the hole 11a of the first belt, and is fitted into the hole 11a of the first belt 11 without any gap. Therefore, the first belt 11 and the second belt 12 are hardly disengaged from each other when the extension-retraction device expands and contracts.

As described above, in the extension-retraction device according to the first embodiment, the fitting portion 21 of the engaging pin 12a has a cylindrical shape having a diameter corresponding to the hole 11a of the first belt, and is fitted into the hole 11a of the first belt 11 without any gap. Accordingly, it is possible to prevent the first belt 11 and the second belt 12 from being disengaged from each other when the extension-retraction device expands and contracts.

Second Embodiment

Engaging Pin Shape

Next, the extension-retraction device according to the second embodiment will be described. The extension-retraction device according to the second embodiment differs from the extension-retraction device according to the first embodiment in the shape of the engaging pin. Other configurations, since the same as the extension-retraction device according to the first embodiment, the description thereof will be omitted.

Figure 4A:
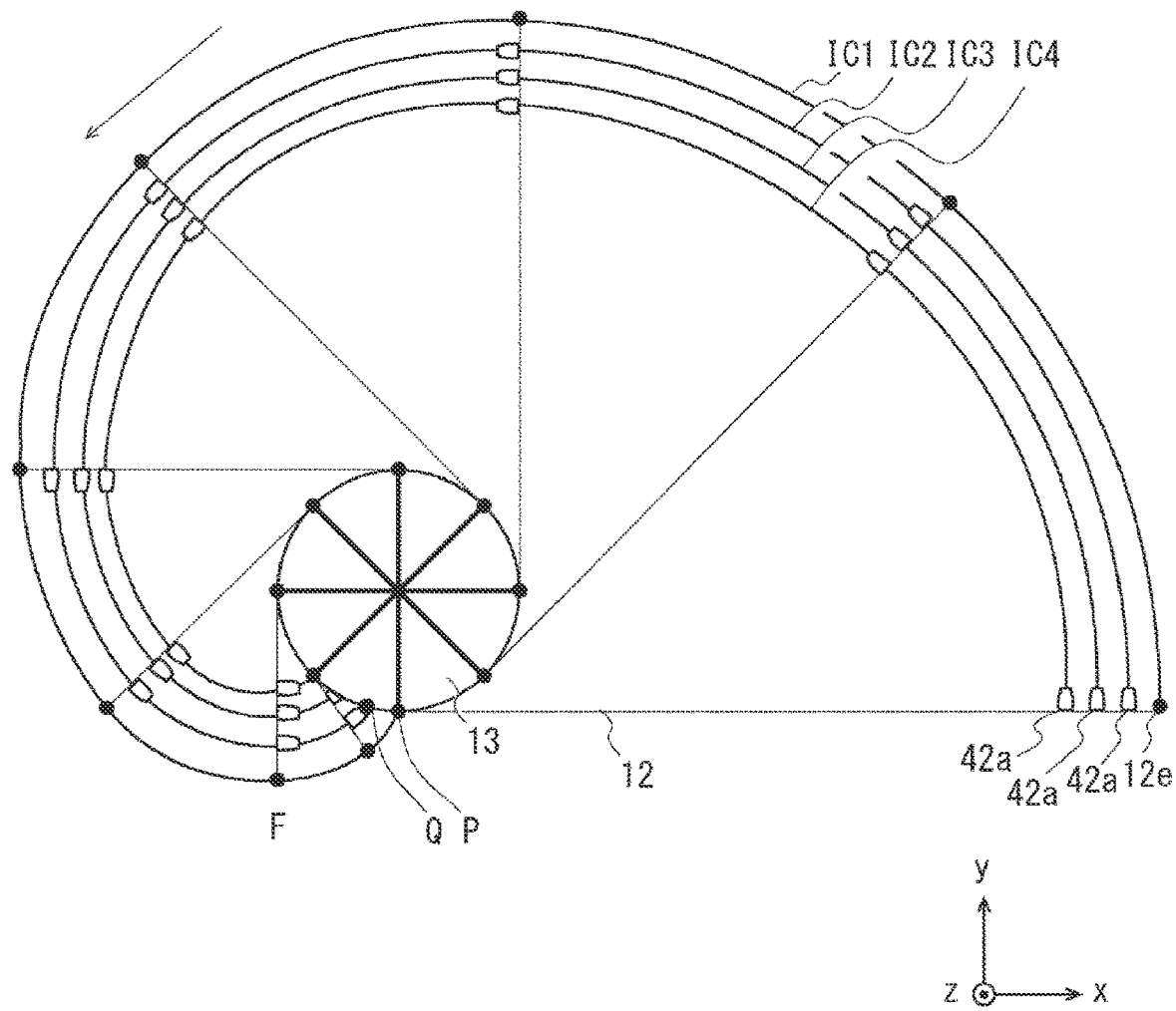
FIG. 4A is a plan view of a tubular construction with a second belt spirally wound.

First, referring to FIG. 4A of the drawings, a trajectory drawn by the engaging pin when the second belt 12 is spirally wound with respect to the tubular structure 13 will be described. FIG. 4A is a plan view of a cylindrical construction when winding a second belt spirally.

As shown in FIG. 4A, when the second belt 12 is spirally wound around the tubular structure 13 with the point P as a fulcrum, the trajectory of the end portion 12e of the second belt is an involute curve IC1 having a circle equal to the diameter of the tubular structure 13 as a base circle.

As shown in FIG. 4A, the engaging pin 42a is provided at a predetermined distance from the second belt 12. When the second belt 12 is spirally wound around the tubular structure 13 with the point P as a fulcrum, the trajectories of the three engaging pin 42a shown in FIG. 4A are involute curve IC2, IC3, IC4 smaller than the involute curve IC1, respectively. As the position of the engaging pin 42a approaches the end portion 12e of the second belt, the trajectory of the engaging pin 42a becomes a curve close to the magnitude of the involute curve IC1. The foundation circle of the involute curve IC2, IC3, IC4 is, like the involute curve IC1, a circle having the diameter of the tubular structure 13.

Figure 4B:
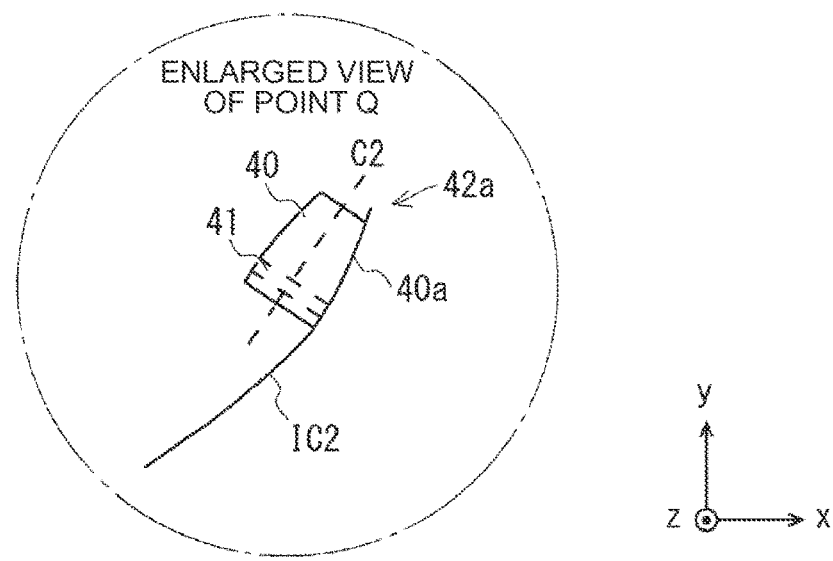
FIG. 4B is an enlarged view of the tubular construction at point Q when the second belt is helically wound around the tubular construction.

Next, referring to FIG. 4B, the configuration of the engaging pin of the extension-retraction device according to the second embodiment will be described. FIG. 4B is an enlarged view at a point Q when the second belt is wound in a spiral shape with respect to the tubular member. Here, an engaging pin 42a that draws a trajectory of the involute curve IC2 will be described. In the following description, in the insertion portion 40 of the engaging pin 42a, the tubular structure 13 side is referred to as a distal end portion, and the fitting portion 41 side is referred to as a root portion.

As shown in FIG. 4B, the engaging pin 42a includes an insertion portion 40 and a fitting portion 41. The insertion portion 40 is formed to protrude from the fitting portion 41. Since the fitting portion 41 is the same as the fitting portion 21 of the engaging pin 12a in the extension-retraction device according to the first embodiment, the explanation thereof will be omitted.

As shown in FIG. 4B, the slope of the side surface 40a of the insertion portion 40 in the engaging pin 42a has the form of an involute curve IC2.

The angle formed by the side surface 40a of the engaging pin 42a and the central axial C2 of the engaging pin 42a decreases toward the distal end portion. In other words, the side surface 40a of the engaging pin 42a is steeply inclined in the vicinity of the root portion, and is gently inclined toward the distal end portion.

As described above, the inclination of the side surface 40a of the insertion portion 40 in the engaging pin 42a has an involute curve IC2 that is a trajectory for spirally winding the second belt 12 around the tubular structure 13. Therefore, the engaging pin 42a can be easily inserted into the hole 11a of the first belt.

Further, after inserting the engaging pin 42a into the hole 11a of the first belt, the engaging pin 42a guides along the involute curve IC2 shape while the side surface 40a contacts the inner peripheral surface of the hole 11a until the fitting portion 41 is fitted into the hole 11a of the first belt. This makes it easier to fit the engaging pin 42a into the hole 11a of the first belt. Further, wear of the engaging pin 42a can be suppressed.

Here, the height of the engaging pin is changed with the depth of the spiral groove of the cylindrical structure. Since the engaging pin 32a in the extension-retraction device according to the comparative example shown in FIG. 3 has a two-step tapered shape, when the height of the engaging pin is changed, the slope of the side surface of the insertion portion needs to be redesigned in accordance with the height. On the other hand, the engaging pin 42a in the extension-retraction device according to the second embodiment shown in FIG. 4B has an involute curve IC2, and therefore, even if the height of the engaging pin is changed, the side surface of the insertion portion corresponding to the height is inclined, and therefore, the time and effort for redesigning is not required.

Modified Examples

Next, referring to FIG. 5, an engaging pin 62a which is a modification of the engaging pin 42a will be described. FIG.

5 is a cross-sectional view illustrating a shape of a modification of the engaging pin in the extension-retraction device according to the second embodiment. In the following description, in the insertion portion 60 of the engaging pin 62a, the tubular structure 13 side is referred to as a distal end portion, and the fitting portion 61 side is referred to as a root portion.

Figure 5:
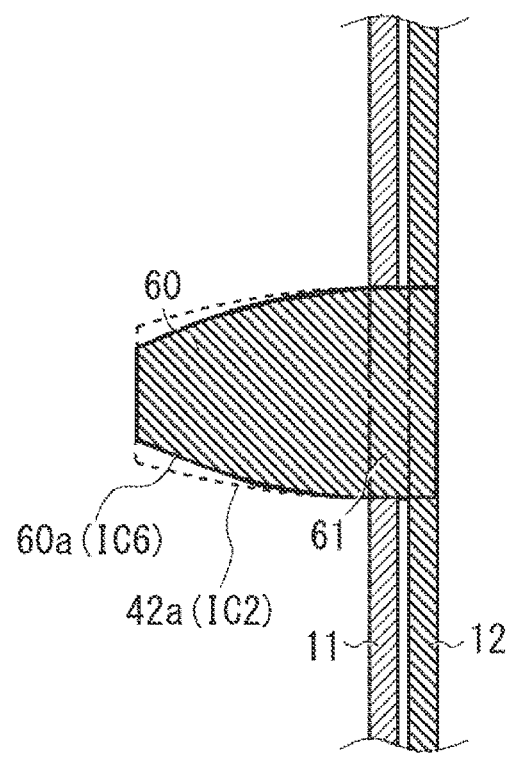
FIG. 5 is a cross-sectional view illustrating a configuration of a modification of the engaging pin in the extension-retraction device according to Embodiment 2.

As illustrated in FIG. 5, the engaging pin 62a includes an insertion portion 60 and a fitting portion 61. The insertion portion 60 is formed to protrude from the fitting portion 61. Since the fitting portion 61 is the same as the fitting portion 21 of the engaging pin 12a according to the first embodiment, the explanation thereof will be omitted. Further, in FIG. 5 shows the form of the engaging pin 42a corresponding to 4B shown in dotted lines.

As shown in FIG. 5, the slope of the side surface 60a of the insertion portion 60 in the engaging pin 62a has the form of an involute curve IC6. The involute curve IC6 has the same center as the tubular structure 13, and a circle smaller than the diameter of the tubular structure 13 is defined as a base circle. That is, the base circle of the involute curve IC6 is smaller than the base circle of the involute curve IC2.

As shown in FIG. 5, the side surface 60a of the engaging pin 62a and the straight line parallel to the z-axis are smaller toward the distal end portion. In other words, the side surface 60a of the engaging pin 62a is steeply inclined at the root portion, and is gently inclined toward the distal end portion.

Referring now to FIG. 5, the shape of the engaging pin 62a and the shape of the engaging pin 42a are compared. The engaging pin 62a has the shape of an involute curve IC6, while the engaging pin 42a has the shape of an involute curve IC2. Therefore, as compared with the engaging pin 42a, the engaging pin 62a is steeper in slope and has a smaller diameter in the z-axis direction at the tip portion from the root portion toward the tip portion of the insertion portion 60. This makes it easier to insert the engaging pin 62a into the hole 11a of the first belt.

As described above, the extension-retraction device according to the second embodiment has an involute curve shape in which the inclination of the side surface of the insertion portion has the same center as that of the cylindrical structure, and a circle that is equal to or smaller than the diameter of the cylindrical structure is used as a base circle. This makes it easier to insert the engaging pin into the hole 11a of the first belt.

The present disclosure is not limited to the above-described embodiments, and can be appropriately modified without departing from the scope of the present disclosure.

What is claimed is:

1. An extension-retraction device comprising:
   a first belt; and
   a second belt, wherein
   the first belt and the second belt are wound around a tubular structure in a spiral;
   the second belt is wound on an outside of the first belt;
   the second belt includes an engaging pin provided with a fitting portion and an insertion portion;
   the fitting portion has a cylindrical shape with a diameter corresponding to a hole of the first belt, and is configured to fit into the hole of the first belt without a gap;
   the insertion portion is configured to protrude from the fitting portion and be inserted into the hole of the first belt;
   a side surface of the insertion portion is inclined such that a diameter of the insertion portion decreases with increasing distance from the fitting portion;
   an inclination of the side surface of the insertion portion has an involute curve shape; and
   a base circle of the involute curve shape is a circle with the same center as a center of the tubular structure and with a diameter smaller than a diameter of the tubular structure.

* * * * *